(12) United States Patent
Aluru et al.

(10) Patent No.: US 11,935,156 B2
(45) Date of Patent: Mar. 19, 2024

(54) METHODS AND SYSTEMS FOR COLOR HARMONIZATION IN SURROUND VIEW SYSTEMS

(71) Applicant: GM GLOBAL TECHNOLOGY OPERATIONS LLC, Detroit, MI (US)

(72) Inventors: Sai Vishnu Aluru, Commerce Township, MI (US); Yun Qian Miao, Waterloo (CA); Sravan Daruri, Walled Lake, MI (US); Mohamed A. Naiel, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 17/651,625

(22) Filed: Feb. 18, 2022

(65) Prior Publication Data

US 2023/0267655 A1    Aug. 24, 2023

(51) Int. Cl.
*G06T 11/00* (2006.01)
*G06T 3/40* (2006.01)
(Continued)

(52) U.S. Cl.
CPC .............. *G06T 11/001* (2013.01); *G06T 7/90* (2017.01); *G06T 2207/10024* (2013.01); *G06T 2207/30252* (2013.01)

(58) Field of Classification Search
CPC ...... G06T 11/001; G06T 7/90; G06T 2207/10024; G06T 2207/30252; G06T 3/4007; G06T 5/00–5/08; G06T 15/50; G06T 15/60; G06T 15/80; G06T 2215/12; G06T 2215/16; G06T 19/00; G06T 19/006; G06T 19/20; G09G 5/02; G09G 5/06; G09G 5/026; G09G 5/28; G09G 5/30; G09G 5/377; G09G 2320/00; G09G 2320/02; G09G 2320/0233; G09G 2320/0242; G09G 2320/0247; G09G 2320/0257; G09G 2320/0276;
(Continued)

(56) References Cited

U.S. PATENT DOCUMENTS 10,129,518 B2 * 11/2018 Pflug ....................... G06T 15/00
11,699,250 B1 *  7/2023 McCann ............. G02B 27/0101
                                                        345/628
(Continued)

FOREIGN PATENT DOCUMENTS

DE   102020133414 A1   7/2021
JP      2007300559 A  11/2007

*Primary Examiner* — Wesner Sajous
(74) *Attorney, Agent, or Firm* — Lorenz & Kopf, LLP

(57) ABSTRACT

Methods and systems are provided for generating a virtual view of a scene associated with a vehicle. In one embodiment, a method includes: obtaining image data including a plurality of images captured by a plurality of cameras of the vehicle; obtaining steering angle data captured by a sensor of the vehicle; detecting, by a processor, a shadow in at least one image of the plurality of images; determining, by the processor, auto-white balance data for each image of the plurality of images; selectively combining, by the processor, the auto-white balance data of the images based on the detected shadow, and the steering angle data; and generating, by the processor, output image data based on the combined auto-white balance data and the image data.

18 Claims, 4 Drawing Sheets

(51) Int. Cl.
  *G06T 7/90*    (2017.01)
  *G09G 5/02*    (2006.01)
  *G09G 5/30*    (2006.01)
  *H04N 1/60*    (2006.01)
  *H04N 5/57*    (2006.01)
  *H04N 9/64*    (2023.01)
  *H04N 13/111*   (2018.01)
  *H04N 23/00*    (2023.01)

(58) Field of Classification Search
  CPC ......... G09G 2320/06; G09G 2320/062; G09G 2320/0626; G09G 2320/0666; G09G 2320/0673; G09G 2320/0686; G09G 2320/0693; G09G 2340/0428; G09G 2340/08; G09G 2340/10; H04N 1/60; H04N 1/6027; H04N 1/6075; H04N 1/6077; H04N 5/14; H04N 5/144; H04N 5/147; H04N 5/57–58; H04N 5/202; H04N 9/64; H04N 9/75–77; H04N 13/111; H04N 13/117; H04N 13/128; H04N 13/15; H04N 13/25; H04N 23/00; H04N 25/00
  See application file for complete search history.

(56)      References Cited

U.S. PATENT DOCUMENTS

| | | |
|---|---|---|
| 2014/0085473 A1 | 3/2014 | Donishi et al. |
| 2016/0301863 A1* | 10/2016 | Petrany .................... B60R 1/00 |
| 2020/0258266 A1* | 8/2020 | Arbeiter .................... G06T 7/40 |

\* cited by examiner

METHODS AND SYSTEMS FOR COLOR HARMONIZATION IN SURROUND VIEW SYSTEMS

TECHNICAL FIELD

The technical field generally relates to surround view images of a vehicle, and more particularly to generating a virtual view having harmonized colors based on image data captured using physical cameras of a vehicle.

Modern vehicles are typically equipped with one or more optical cameras that are configured to provide image data to an occupant of the vehicle. The image data may show a virtual scene of the vehicle's surroundings. The virtual scene may be generated based on multiple images that are captured from different perspectives. Merging image data from image sources that are located at different positions about the vehicle might cause undesired effects in the output image of the virtual camera. Such undesired effects may include variability in colors between the transition from the different camera views.

Accordingly, it is desirable to provide systems and methods for generating a virtual view of a scene captured by cameras with improved quality of the virtual scene by providing color harmonization. Furthermore, other desirable features and characteristics of the present invention will become apparent from the subsequent detailed description and the appended claims, taken in conjunction with the accompanying drawings and the foregoing technical field and background.

SUMMARY

A method for generating a virtual view of a scene associated with a vehicle is provided. In one embodiment, the method includes: obtaining image data including a plurality of images captured by a plurality of cameras of the vehicle; obtaining steering angle data captured by a sensor of the vehicle; detecting, by a processor, a shadow in at least one image of the plurality of images; determining, by the processor, auto-white balance data for each image of the plurality of images; selectively combining, by the processor, the auto-white balance data of the images based on the detected shadow, and the steering angle data; and generating, by the processor, output image data based on the combined auto-white balance data and the image data.

In various embodiments, the selectively combining includes: prioritizing the images based on the detected shadow and the steering angle; and assigning a weight to each image based on the priority; and computing a weighted average of the auto-white balance data based on the assigned weights.

In various embodiments, the prioritizing the images includes assigning a first priority to an image within a range of the steering angle data; and assigning as second priority to the image with the detected shadow, wherein the second priority is less than the first priority.

In various embodiments, the method includes converting the image data to monochromatic data; applying a gain value to combined auto-white balance data; and wherein the generating the output image data is based on the monochromatic data and the gain adjusted auto-white balance data.

In various embodiments, the method includes determining a region of interest within each image of the plurality of images, and wherein the determining the auto-white balance data is based on the region of interest.

In various embodiments, the determining the auto-white balance data is based on exterior lighting conditions associated with a location of the vehicle.

In various embodiments, the method includes: the determining the auto-white balance data is based on climate conditions associated with a location of the vehicle.

In various embodiments, the detecting the shadow is based on solar data and vehicle dynamics data.

In various embodiments, the method includes determining an azimuth angle and a sun elevation based; determining a vehicle heading and a pitch angle; and detecting a shadow region based on the azimuth angle, the sun elevation, the vehicle heading, and the pitch angle.

In various embodiments, the generating the output image data is from a birds-eye-viewpoint.

In various embodiments, the method includes determining luminance data for each image of the plurality of images; selectively combining the luminance data of the images based on the detected shadow, and the steering angle data; and generating, by the processor, the output image data based on the combined luminance data and the image data.

In another embodiment a vehicle that is configured to generate a virtual view of a scene is provided. The vehicle includes: a plurality of cameras configured to capture an input image of an environment of the vehicle; and a controller. The controller is configured to: obtain image data including a plurality of images captured by a plurality of cameras of the vehicle; obtain steering angle data captured by a sensor of the vehicle; detect, by a processor, a shadow in at least one image of the plurality of images; determine, by the processor, auto-white balance data for each image of the plurality of images; selectively combine, by the processor, the auto-white balance data of the images based on the detected shadow, and the steering angle data; and generate, by the processor, output image data based on the combined auto-white balance data and the image data.

In various embodiments, the selectively combining includes prioritizing the images based on the detected shadow and the steering angle; and assigning a weight to each image based on the priority; and computing a weighted average of the auto-white balance data based on the assigned weights.

In various embodiments, the prioritizing the images includes assigning a first priority to an image within a range of the steering angle data; and assigning as second priority to the image with the detected shadow, wherein the second priority is less than the first priority.

In various embodiments, the controller is further configured to: convert the image data to monochromatic data; apply a gain value to combined auto-white balance data. The generating the output image data is based on the monochromatic data and the gain adjusted auto-white balance data.

In various embodiments, the controller is further configured to: determine a region of interest within each image of the plurality of images. The determining the auto-white balance data is based on the region of interest.

In various embodiments, the determining the auto-white balance data is based on exterior lighting conditions associated with a location of the vehicle.

In various embodiments, the determining the auto-white balance data is based on climate conditions associated with a location of the vehicle.

In various embodiments, the detecting the shadow is based on solar data and vehicle dynamics data.

In various embodiments, the controller is further configured to: determine an azimuth angle and a sun elevation based; determine a vehicle heading and a pitch angle; and detect a shadow region based on the azimuth angle, the sun elevation, the vehicle heading, and the pitch angle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
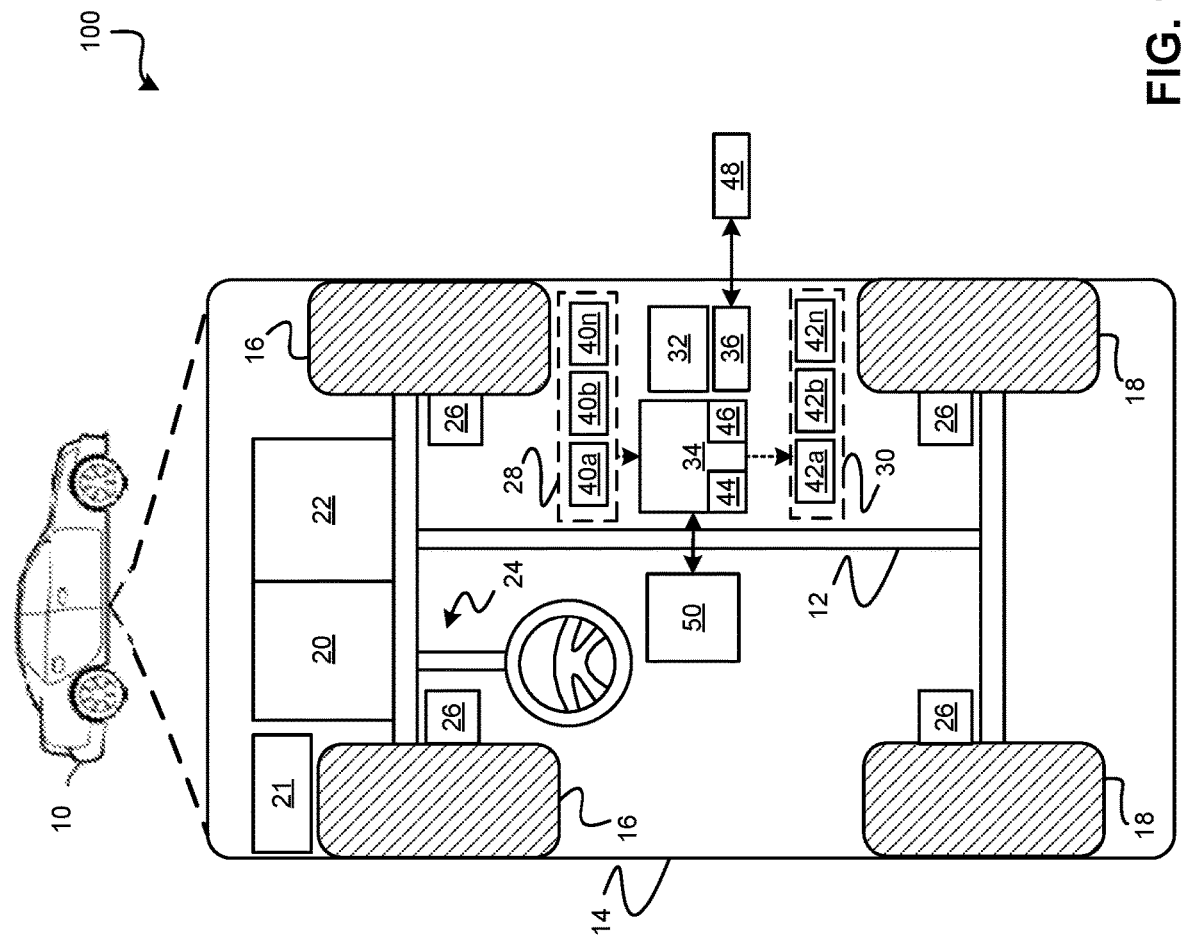
FIG. 1 is a schematic illustration of a vehicle with a controller implementing functions for generating a virtual view in accordance with various embodiments.

With reference to FIG. 1, a vehicle 10 is shown having a surround view display system 100 in accordance with various embodiments. Generally, the surround view display system 100 displays image data on a display 50 of the vehicle 10 to illustrate a surrounding view of the exterior environment of the vehicle 10 from a defined viewpoint, such as, but not limited to a birds-eye-viewpoint. As will be discussed in more detail below, the surround view display system 100 displays image data having harmonized color.

The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating a virtual view having harmonized color in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems (GPS), optical cameras, thermal cameras, ultrasonic sensors, and/or other sensors. The sensing devices 40*a*-40*n* are further configures to sense observable conditions of the vehicle 10. The sensing devices 40*a*-40*n* can include, but are not limited to, speed sensors, position sensors, inertial measurement sensors, temperature sensors, pressure sensors, etc.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
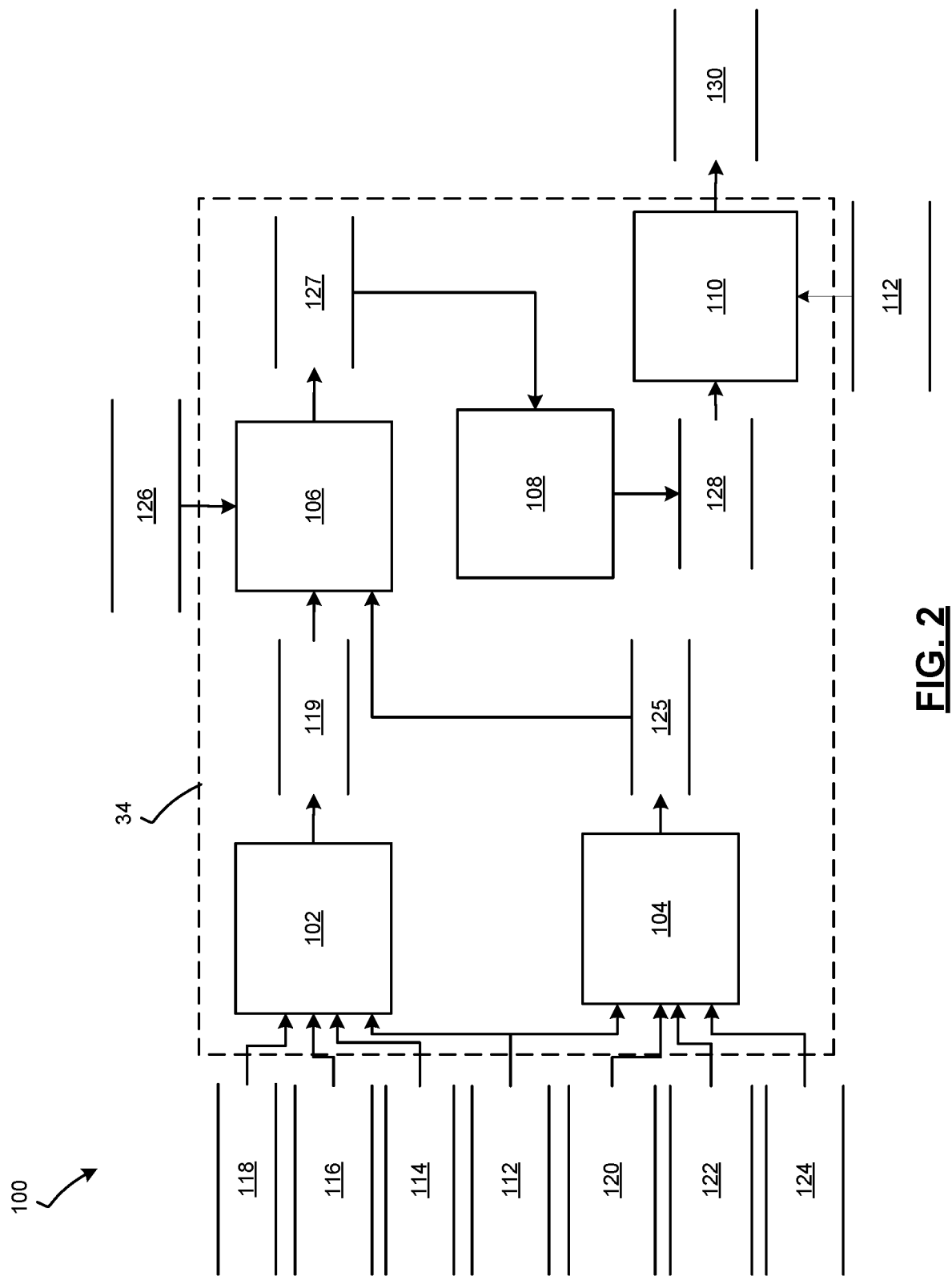
FIG. 2 is dataflow diagram illustrating the controller of the vehicle in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the surround view display system 100 and, when executed by the processor 44, detects shadows in the image data generated by the optical cameras; and applies color harmonization to image data based on the detected shadows and steering angle data when generating the surround view. In various embodiments, the sensing devices 40*a* to 40*n* include cameras that sense an external environment of the vehicle 10 and generate the image data (e.g., optical cameras that is configured to capture color pictures of the environment); and one or more of the sensing devices 40*a* to 40*n* is a steering sensor that senses a steering angle of the steering wheel or other steering component and generates the steering angle data.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

In various embodiments, the image data is captured from N optical cameras disposed about the vehicle 10. The cameras are disposed so that they each cover a certain field of view of the vehicle's surroundings. The image data from each camera is assembled into a surround view based on, for example, the pose and the location of the camera relative to the vehicle. The color of the assembled data is improved by methods and systems disclosed herein.

With reference to FIG. 2, and with continued reference to FIG. 1, a dataflow diagram illustrates elements of the surround view display system 100 of FIG. 1 in accordance with various embodiments. As can be appreciated, various embodiments of the surround view display system 100 according to the present disclosure may include any number of modules embedded within the controller 34 which may be combined and/or further partitioned to similarly implement systems and methods described herein. Furthermore, inputs to the surround view display system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the surround view display system 100 includes a shadow detection module 102, an auto-white balance (AWB) determination module 104, a combined AWB determination module 106, a color adjustment module 108, and a viewpoint display module 110.

In various embodiments, the shadow detection module 102 receives as input image data 112, GPS data 114, vehicle dynamics data 116, and solar data 118. In various embodiments, the image data 112 includes the images captured by the N cameras of the vehicle 10 positioned at different locations about the vehicle 10. In various embodiments, the GPS data 114 includes the location, the time, and the elevation of the vehicle 10 at the time the images were obtained; and the vehicle dynamics data 116 includes the pitch, the roll, and the yaw of the vehicle 10 at the time the images were obtained.

Based on the inputs 112-118, the shadow detection module 102 detects shadows within the images and generates shadow data 119 based thereon. For example, the shadow detection module 102 determines a solar position, a vehicle heading, and a vehicle pitch angle associated with the images. In various embodiments, the solar position includes a sun elevation and a sun azimuth. The shadow detection module 102 then evaluates the image data 112 to detect a shadow region in this image data based on the solar position data, the vehicle heading data, and the vehicle pitch data. For example, given vehicle heading angle aligned with sun azimuth angle and the sun elevation angle greater than zero degree, the solar shadow is determined in vehicle rear camera view, not the others. By combining this solar position based shadow region prediction with image illumination level change detection, the shadow detection module 102 outputs a shadow region in the images of respective cameras.

In various embodiments, the auto-white balance determination module 104 receives as input the image data 112, vehicle location data 120, vehicle exterior lighting data 122, and climate data 124. In various embodiments, the vehicle location data 120 includes a location of the vehicle 10 at the time the images were captured; the vehicle exterior lighting data 122 indicates any exterior lighting generated by the vehicle 10 and/or the elements of the environment at the location of the vehicle 10; and the climate data 124 indicates the climate associated with the vehicle location.

Based on the inputs, the auto-white balance determination module 104 determines a region of interest (ROI) in each image and evaluates the region of interest to determine luminance and auto-white balance data 125. In various embodiments, the auto-white balance determination module 104 uses the GPS location and time to extract climate factors and solar position/shadow locations for optimizing the computation of the AWB and luminance.

In various embodiments, the combined AWB determination module 106 receives as input the auto-white balance data 125, steering angle data 126, and the shadow data 119. The combined AWB determination module 106 determines a priority of the images by giving higher priority to images with views that are close to the vehicle heading direction indicated by the steering wheel angle data and by giving less priority to the images that have a detected shadow. The combined AWB determination module 106 assigns a weight to each image based on the priority. The combined AWB determination module 106 then computes a weighted average of the luminance and auto-white balance data 125 and generates average AWB data 127 based thereon.

The color adjustment module 108 receives as input the average AWB data 127. The color adjustment module 108 adds a chromatic gain to the average AWB data 127 to make the view more colorful and generates adjustment data 128 based thereon.

The viewpoint display module 110 receives as input the adjustment data 128 and the image data 112. The viewpoint display module adjusts the image to be monochromatic and then combines the monochromatic image data according to the viewpoint and harmonizes the combined data based on the adjustment data 128. The viewpoint display module generates display data 130 for displaying the harmonized image data according to the designated perspective on the display 50 of the vehicle 10. As can be appreciated, this approach offers consistent harmonized color that is robust against shadow and less important background areas.

Figure 3:
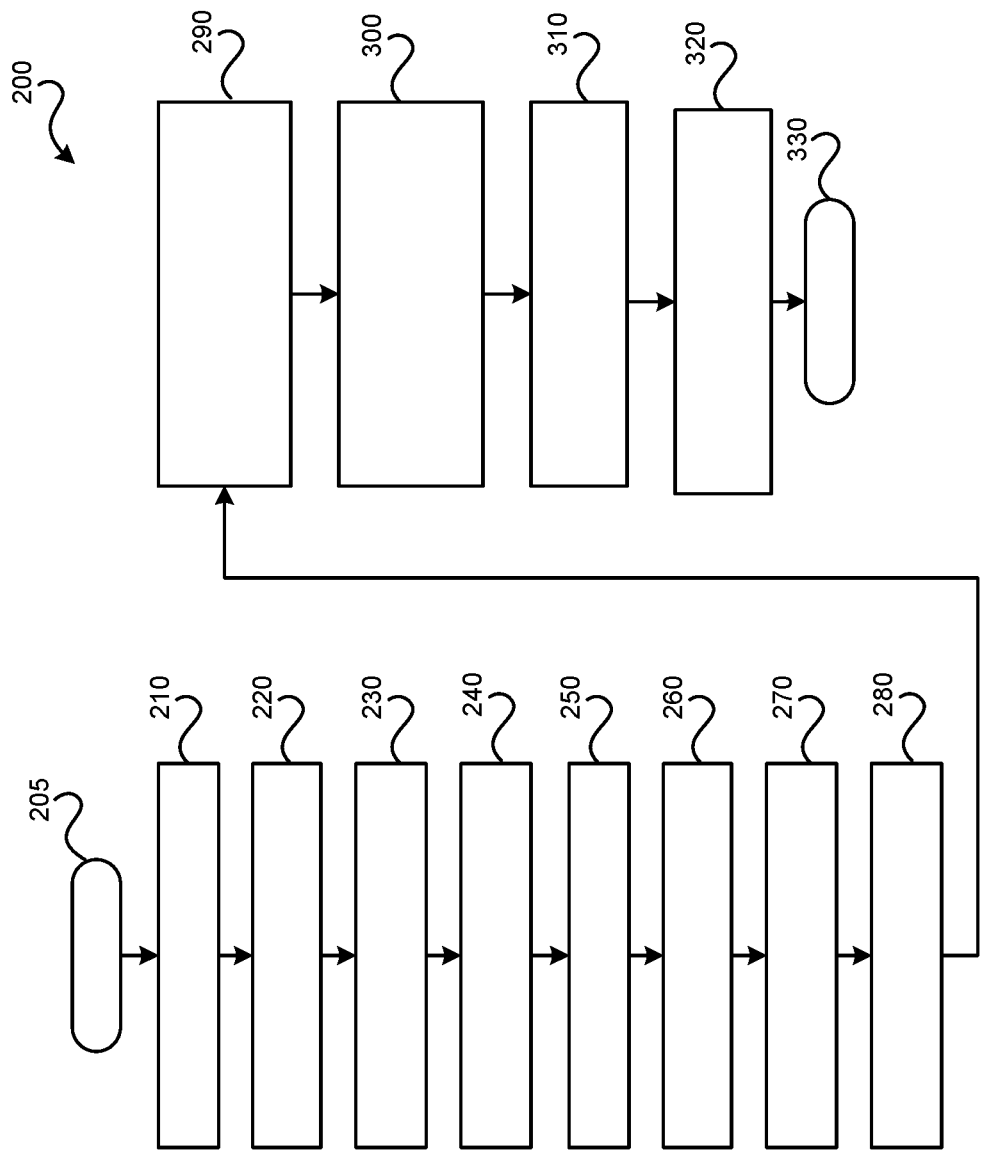
FIGS. 3 and 4 are flowcharts illustrating methods performed by the vehicle and the controller in accordance with various embodiments.

With reference to FIG. 3 and with continued reference to FIGS. 1-2, a flowchart is provided of a method 200 for displaying surround view image data within the vehicle 10 of FIG. 1 using the surround view system 100 of FIG. 2. As can be appreciated in light of the disclosure, the order of operation within the method is not limited to the sequential execution as illustrated in FIG. 3, but may be performed in one or more varying orders as applicable and in accordance with the present disclosure. In various embodiments, the method 200 can be scheduled to run based on one or more predetermined events, and/or can run continuously during operation of the vehicle 10.

In one example, the method may begin at 205. Input data is obtained at 210-240. For example, image data depicting images from N cameras is obtained at 210. The GPS location data and associated climate data corresponding to the image data are obtained at 220. The steering angle data corresponding to the image data is obtained at 230. Vehicle exterior lighting data corresponding to the image data is obtained at 240.

Figure 4:
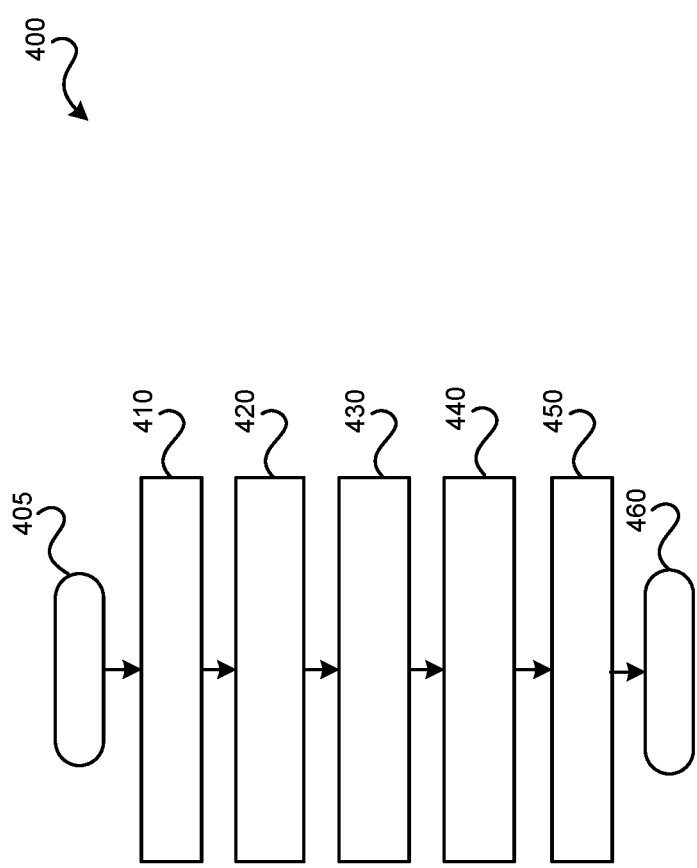

Thereafter, the image data is processed at 250 to detect shadows in the images, for example, as shown in the method of FIG. 4. The image data is further processed to determine at least one region of interest (ROI) from a viewpoint, such as a top-down viewpoint, of the images at 260.

For each ROI of each image, the auto-white balance (AWB) values and luminance values are determined at 270. The ROI is converted to monochromatic values at 280.

Thereafter, a priority of the images is determined based on the steering angle and the detected shadows at 290. A weighted average is then computed from the AWB values and the luminance values from the images based on the priority. A chromatic gain is applied to the weighted average to make the view colorful at 300. The surround view is then computed from the image data and the adjustment values and displayed on the display of the vehicle 10 at 310. Thereafter, the method may end at 320.

With reference to FIG. 4 and with continued reference to FIGS. 1-3, a flowchart is provided of a method 400 for detecting shadows in an image as performed by the method of providing surround view image data within the vehicle 10 in accordance with various embodiments. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10.

In one example, the method may begin at 405. The input data is obtained at 410-420. For example, the location, time, and elevation of the vehicle 10 corresponding to the image data is obtained at 410. Vehicle dynamics information such as, but not limited to, pitch, roll, yaw is obtained at 420.

Thereafter, at 430, a solar position including the sun elevation and sun azimuth is determined based on the location, time, and elevation. At 440, the vehicle heading, and pitch angles are determined. Thereafter, at 450, a shadow region is predicted within the image based on the solar position data, the vehicle heading data, and the vehicle pitch data. Thereafter, the method may end at 460.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating a virtual view of a scene associated with a vehicle, the method comprising:
   obtaining image data including a plurality of images of the scene captured by a plurality of cameras of the vehicle;
   obtaining steering angle data captured by a sensor of the vehicle;
   detecting, by a processor, a shadow in at least one image of the plurality of images based on solar position data;
   determining, by the processor, auto-white balance data for each image of the plurality of images;
   selectively combining, by the processor, the auto-white balance data of the images based on the detected shadow, and the steering angle data, wherein the selectively combining comprises:
   prioritizing the images based on the detected shadow and the steering angle; and
   assigning a weight to each image based on the priority; and
   computing a weighted average of the auto-white balance data based on the assigned weights; and
   generating, by the processor, output image data to provide the virtual view of the scene on a display of the vehicle based on the combined auto-white balance data and the image data.

2. The method of claim 1, wherein the prioritizing the images comprises:
   assigning a first priority to an image within a range of the steering angle data; and
   assigning as second priority to the image with the detected shadow, wherein the second priority is less than the first priority.

3. The method of claim 1, further comprising:
   determining a region of interest within each image of the plurality of images, and wherein the determining the auto-white balance data is based on the region of interest.

4. The method of claim 1, wherein the determining the auto-white balance data is based on exterior lighting conditions associated with a location of the vehicle.

5. The method of claim 1, wherein the determining the auto-white balance data is based on climate conditions associated with a location of the vehicle.

6. The method of claim 1, wherein the detecting the shadow is further based on vehicle dynamics data.

7. The method of claim 6, wherein the solar position data includes
   an azimuth angle and a sun elevation
   and wherein the method comprises:
   detecting the shadow region based on the azimuth angle, the sun elevation, a vehicle heading, and a pitch angle.

8. The method of claim 1, wherein the generating the output image data is from a birds-eye-viewpoint.

9. The method of claim 1, further comprising:
   determining luminance data for each image of the plurality of images;
   selectively combining the luminance data of the images based on the detected shadow, and the steering angle data; and
   generating, by the processor, the output image data based on the combined luminance data and the image data.

10. A method for generating a virtual view of a scene associated with a vehicle, the method comprising:
    obtaining image data including a plurality of images of the scene captured by a plurality of cameras of the vehicle;
    obtaining steering angle data captured by a sensor of the vehicle;
    detecting, by a processor, a shadow in at least one image of the plurality of images based on solar position data;
    determining, by the processor, auto-white balance data for each image of the plurality of images;
    selectively combining, by the processor, the auto-white balance data of the images based on the detected shadow, and the steering angle data;
    converting the image data to monochromatic data;
    applying a gain value to combined auto-white balance data; and
    generating, by the processor, output image data to provide the virtual view of the scene on a display of the vehicle based on the combined auto-white balance data, the image data, and the gain adjusted auto-white balance data.

11. A vehicle that is configured to generate a virtual view of a scene, the vehicle comprising a plurality of cameras configured to capture an input image of a scene of an environment of the vehicle; and
a controller;
wherein the controller is configured to:
- obtain image data including a plurality of images captured by a plurality of cameras of the vehicle;
- obtain steering angle data captured by a sensor of the vehicle;
- detect, by a processor, a shadow in at least one image of the plurality of images based on solar position data;
- determine, by the processor, auto-white balance data for each image of the plurality of images;
- selectively combine, by the processor, the auto-white balance data of the images based on the detected shadow, and the steering angle data, wherein the selectively combining comprises: prioritizing the images based on the detected shadow and the steering angle; and assigning a weight to each image based on the priority; and computing a weighted average of the auto-white balance data based on the assigned weights; and
- generate, by the processor, output image data to provide the virtual view of the scene on a display of the vehicle based on the combined auto-white balance data and the image data.

12. The vehicle of claim 11, wherein the prioritizing the images comprises:
- assigning a first priority to an image within a range of the steering angle data; and
- assigning as second priority to the image with the detected shadow, wherein the second priority is less than the first priority.

13. The vehicle of claim 11, wherein the controller is further configured to:
- convert the image data to monochromatic data;
- apply a gain value to combined auto-white balance data; and
- wherein the generating the output image data is based on the monochromatic data and the gain adjusted auto-white balance data.

14. The vehicle of claim 11, wherein the controller is further configured to:
- determine a region of interest within each image of the plurality of images, and wherein the determining the auto-white balance data is based on the region of interest.

15. The vehicle of claim 11, wherein the determining the auto-white balance data is based on exterior lighting conditions associated with a location of the vehicle.

16. The vehicle of claim 11, wherein the determining the auto-white balance data is based on climate conditions associated with a location of the vehicle.

17. The vehicle of claim 11, wherein the detecting the shadow is further based on vehicle dynamics data.

18. The vehicle of claim 17, wherein the solar position data includes an azimuth angle and a sun elevation, and wherein controller is further configured to:
- detect the shadow region based on the azimuth angle, the sun elevation, a vehicle heading, and a pitch angle.

* * * * *